United States Patent
Bonke et al.

(10) Patent No.: US 8,743,502 B1
(45) Date of Patent: Jun. 3, 2014

(54) DISK DRIVE SPINNING DOWN DISK TO A SPIN RATE BASED ON SPIN-UP PARAMETER

(75) Inventors: Carl E. Bonke, Coto de Caza, CA (US); Daniel D. Reno, Morgan Hill, CA (US); Nathan J. Santee, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 402 days.

(21) Appl. No.: 12/972,091

(22) Filed: Dec. 17, 2010

(51) Int. Cl.
    *G11B 15/46* (2006.01)

(52) U.S. Cl.
    USPC ........................................ 360/73.03; 318/268

(58) Field of Classification Search
    None
    See application file for complete search history.

(56) References Cited

U.S. PATENT DOCUMENTS

| | | | |
|---|---|---|---|
| 6,055,120 A * | 4/2000 | Schirle | 360/73.03 |
| 6,078,158 A | 6/2000 | Heeren et al. | |
| 6,717,763 B2 | 4/2004 | Ottesen et al. | |
| 6,785,083 B2 | 8/2004 | Sloan et al. | |
| 6,865,506 B1 | 3/2005 | Escobar et al. | |
| 6,989,953 B1 | 1/2006 | Codilian | |
| 7,075,744 B2 | 7/2006 | Cumpson et al. | |
| 2004/0124800 A1 * | 7/2004 | Tanner | 318/471 |
| 2005/0141375 A1 * | 6/2005 | Ehrlich et al. | 369/47.38 |
| 2005/0268132 A1 | 12/2005 | Yun et al. | |
| 2007/0070539 A1 * | 3/2007 | Lee et al. | 360/73.03 |
| 2008/0168219 A1 | 7/2008 | Molaro et al. | |
| 2009/0059414 A1 | 3/2009 | Lee et al. | |
| 2010/0157463 A1 | 6/2010 | Arizono et al. | |

* cited by examiner

*Primary Examiner* — Andrew L Sniezek

(57) ABSTRACT

A disk drive comprising a head actuated over a disk, and control circuitry operable to spin the disk at a first spin rate. The control circuitry is further operable to reduce the spin rate of the disk from the first spin rate to a second spin rate, wherein the second spin rate is based on a spin-up parameter associated with spinning up the disk from the second spin rate to the first spin rate. For example, the spin-up parameter may comprise one or more of a spin-up time limit, power setting, and ambient temperature.

24 Claims, 5 Drawing Sheets

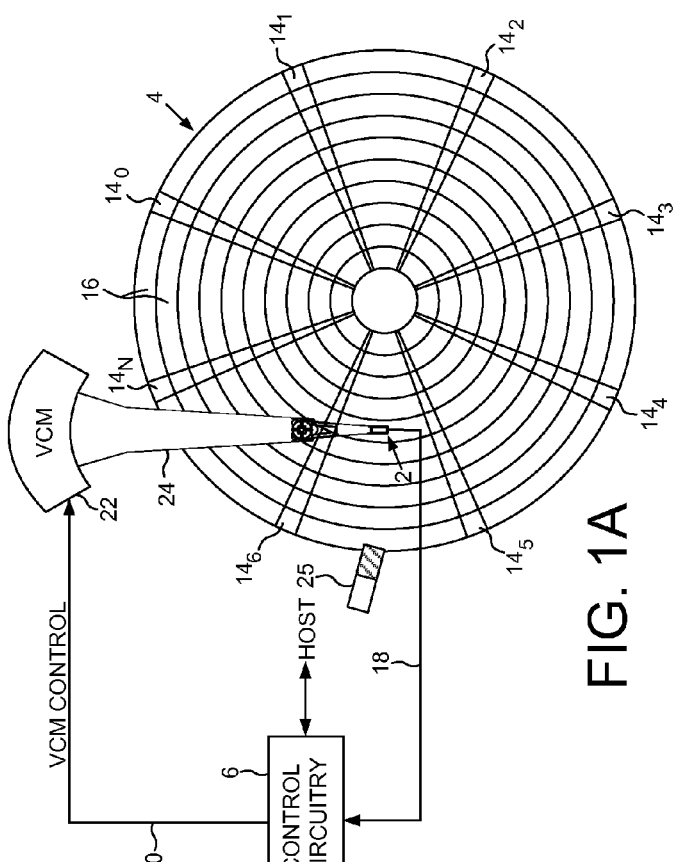
FIG. 1A
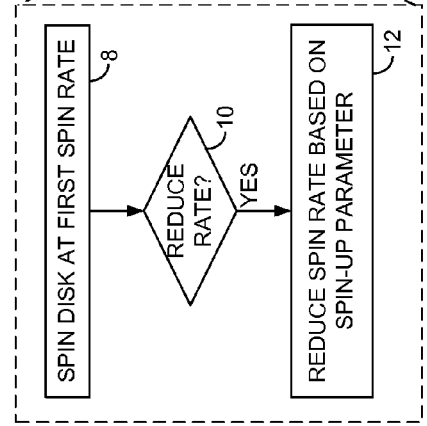
FIG. 1B
| SPIN-UP TIME | SPIN-UP CURRENT | | |
|---|---|---|---|
| | D Peak | E Peak | F Peak |
| A Sec | L RPM | K RPM | I RPM |
| B Sec | K RPM | I RPM | G RPM |
| C Sec | J RPM | H RPM | G RPM |
| Max | G RPM | G RPM | G RPM |
FIG. 1C

FIG. 2A

A Sec Spin-Up

| MODE | SPIN RATE | |
|---|---|---|
| 1 | L RPM | D Peak |
| 2 | K RPM | E Peak |
| 3 | I RPM | F Peak |

FIG. 2B

B Sec Spin-Up

| MODE | SPIN RATE | |
|---|---|---|
| 1 | K RPM | D Peak |
| 2 | I RPM | E Peak |
| 3 | G RPM | F Peak |

FIG. 2C

C Sec Spin-Up

| MODE | SPIN RATE | |
|---|---|---|
| 1 | J RPM | D Peak |
| 2 | H RPM | E Peak |
| 3 | G RPM | F Peak |

FIG. 2D

Max Sec Spin-Up

| MODE | SPIN RATE | |
|---|---|---|
| 1 | G RPM | D Peak |
| 2 | G RPM | E Peak |
| 3 | G RPM | F Peak |

| MODE | SPIN-UP TIME | SPIN-UP CURRENT |
|---|---|---|
| 1 | Var_1 | Var_2 |
| 2 | Var_1 | Var_2 |
| 3 | Var_1 | Var_2 |

SPIN RATE = Func(Var_1, Var_2)

| MODE | SPIN-UP TIME | SPIN-UP CURRENT | TEMP |
|---|---|---|---|
| 1 | Var_1 | Var_2 | Var_3 |
| 2 | Var_1 | Var_2 | Var_3 |
| 3 | Var_1 | Var_2 | Var_3 |

SPIN RATE = Func(Var_1, Var_2, Var_3)

DISK DRIVE SPINNING DOWN DISK TO A SPIN RATE BASED ON SPIN-UP PARAMETER

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo control system to control the velocity of the actuator arm as it seeks from track to track. When the disk drive enters an idle mode, the head may be unloaded onto a ramp near the outer periphery of the disk so that the spin rate of the disk can be reduced to conserve power. When the disk drive receives an access command from the host, the disk is spun up to an operating speed and then the head is slid off the ramp (loaded over the spinning disk surface).

BRIEF DESCRIPTION OF THE DRAWINGS

FIG. 1A shows a disk drive according to an embodiment of the present invention comprising a head actuated over a disk.

FIG. 1B is a flow diagram according to an embodiment of the present invention wherein when entering a different operating mode the disk is spun down to a reduced spin rate that is based on a spin-up parameter.

FIG. 1C shows an embodiment of the present invention wherein the spin-up parameter comprises a spin-up time and a peak current associated with spinning up the disk.

FIGS. 2A-2D show an embodiment of the present invention wherein the reduced spin rate is determined by indexing one of multiple lookup tables, wherein each lookup table corresponds to a specific spin-up time.

DETAILED DESCRIPTION OF EMBODIMENTS OF THE INVENTION

Figures 3A, 3B, 4:
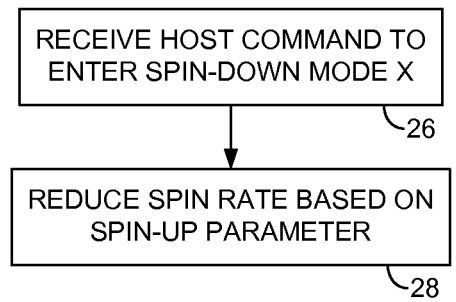
FIG. 3A shows an embodiment of the present invention wherein the reduced spin rate is computed as a function of the spin-up parameter(s).
FIG. 3B shows an embodiment of the present invention wherein the spin-up parameter comprises a spin-up time, a peak current, and an ambient temperature of the disk drive.
FIG. 4 is a flow diagram according to an embodiment of the present invention wherein the disk drive receives a host command to enter one of a plurality of operating modes and the disk is spun down to a rate corresponding to the operating mode.

FIG. 1A shows a disk drive according to an embodiment of the present invention comprising a head 2 actuated over a disk 4, and control circuitry 6 operable to execute the flow diagram of FIG. 1B, wherein the disk 4 is spun at a first spin rate (step 8). The control circuitry 6 is further operable to reduce the spin rate of the disk from the first spin rate to a second spin rate (step 10), wherein the second spin rate is based on a spin-up parameter associated with spinning up the disk from the second spin rate to the first spin rate (step 12).

In the disk drive of FIG. 1A, a plurality of embedded servo sectors $14_0$-$14_N$ are recorded on the disk 4 to define the plurality of data tracks 16. Each servo sector comprises suitable position information, such as a track address providing coarse position information and servo bursts providing fine position information. As the head 2 passes over a servo sector, the control circuitry 6 demodulates a read signal 18 emanating from the head into a position error signal (PES). The PES is filtered by a suitable compensation filter to generate a control signal 20 applied to a voice coil motor (VCM) 22. The VCM 22 rotates an actuator arm 24 about a pivot in order to position the head 2 radially over the disk 4 in a direction that reduces the PES.

The disk drive in the embodiment of FIG. 1A further comprises a ramp 25 extending over the out edge of the disk 4, wherein the control circuitry rotates the actuator arm 24 in order to park the head 2 on the ramp 25 when the disk drive is powered off, or when entering an idle mode. In one embodiment, the first spin rate (step 8 of FIG. 1B) corresponds to an operating mode of the disk drive wherein the head is flying over the disk surface, and the second spin rate (reduced spin rate) corresponds to an idle mode wherein the head is parked on the ramp. In another embodiment, the first spin rate may correspond to a high performance operating mode (high throughput and high power consumption), whereas the second spin rate may correspond to a lower performance operating mode (lower throughput and lower power consumption). For example, the disk drive may enter the lower performance mode when operating on battery power, and then transition into the high performance mode when plugged into an outlet.

In the embodiments of the present invention, the second spin rate (reduced spin rate) is based on any suitable spin-up parameter. FIG. 1C illustrates an embodiment of the present invention wherein the second spin rate (G-L RPM) is based on a spin-up time required to spin up the disk from the second spin rate to the first spin rate, as well as a power setting (e.g., a peak current available when spinning up the disk). For example, as the target spin-up time decreases, the second spin rate increases to ensure that the target spin-up time can be met. Similarly, as the peak current available to spin up the disk decreases, the second spin rate increases to ensure the target spin-up time can be met. In the embodiment of FIG. 1C, there may be a single spin-up time with different possible peak currents, or a single peak current with different possible spin-up times, or both the spin-up time and the peak current may be variable.

In one embodiment, the table shown in FIG. 1C is implemented as a multi-dimensional lookup table indexed by the spin-up time and peak current. For example, a particular operating mode may specify a spin-up time limit and a peak current to be used during the spin up operation. When entering the operating mode, the control circuitry indexes the table of FIG. 1C using the spin-up time limit and peak current to determine the second spin rate (reduced spin rate) when spinning down the disk. FIGS. 2A-2D show an alternative embodiment wherein the disk drive comprises multiple tables, and each table corresponds to a specified spin-up time limit. The control circuitry selects the appropriate table based on the spin-up time limit, and then indexes the selected table with a second spin-up parameter (e.g., peak current) to determine the second spin rate.

FIG. 3A illustrates another embodiment of the present invention wherein the spin-up parameters may be specified as variables that are used to compute the second spin rate as a function of the spin-up parameters. Any suitable function may be used to compute the second spin rate based on the spin-up parameters, such as any suitable polynomial. In addition, the function may be adapted over time based on a measured spin-up time as described in more detail below with reference to FIG. 6A.

Any suitable spin-up parameter may be evaluated in order to determine the second spin rate (reduced spin rate) when entering a different operating mode. FIG. 3B shows an embodiment of the present invention wherein the spin-up parameters may comprise an ambient temperature of the disk drive. That is, the ambient temperature of the disk drive may impact the ability of the control circuitry to spin up the disk (e.g., the actual spin-up time may increase as the temperature decreases). Accordingly, the control circuitry may adjust the second, reduced spin rate to account for a change in the ambient temperature.

The control circuitry may change operating modes and corresponding spin rates in any suitable manner. In one embodiment, the control circuitry may be configured to enter a different operating mode based on one or more operating parameters. For example, the control circuitry may enter an idle mode and reduce the spin rate of the disk if an access command has not been received from the host after a specified time interval (that may be fixed or adjustable). In another embodiment illustrated in the flow diagram of FIG. 4, the control circuitry is operable to receive a command from a host to enter an operating mode associated with the second, reduced spin rate (step 26). The control circuitry reduces the spin rate based on the spin-up parameter and the operating mode entered in response to the host command (step 28).

In one embodiment, the control circuitry is operable to receive a command from the host to enter one of a plurality of operating modes, and reduces the spin rate of the disk to one of a plurality of spin rates corresponding to the operating mode, wherein the reduced spin rate is based on the spin-up parameter. For example, in one embodiment the host may command the disk drive to enter one of a plurality of idle modes that may correspond to different power consumption modes. The spin rate may be reduced to different levels corresponding to different levels of power consumption. In one embodiment, the host command may generally include an operating mode, and in another embodiment, the host command may further include the spin-up parameter(s) associated with each operating mode (e.g., the spin-up time limit and/or power setting for the operating mode). In yet another embodiment, the host may transmit commands to pre-configure the spin-up parameters for each operating mode prior to sending a command to enter an operating mode.

Figure 5:
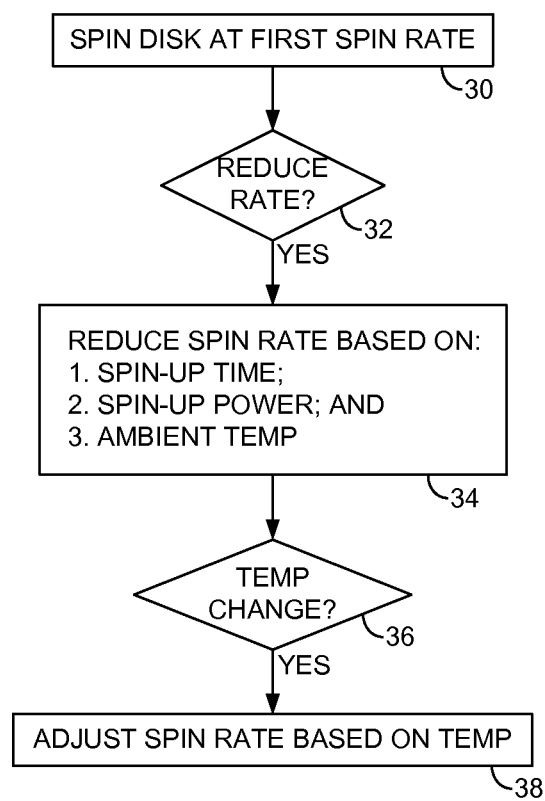
FIG. 5 is a flow diagram according to an embodiment of the present invention wherein the reduced spin rate is selected based on an ambient temperature and then the reduced spin rate is adjusted as the ambient temperature changes.

FIG. 5 is a flow diagram according to an embodiment of the present invention wherein while spinning the disk at a first spin rate (step 30), a decision is made to reduce the spin rate (step 32), wherein the reduced spin rate is selected based on a spin-up time limit, a spin-up power setting, and the present ambient temperature of the disk drive (step 34). After reducing the spin rate, the control circuitry monitors the ambient temperature, and when the ambient temperature changes (step 36), the control circuitry adjusts the reduced spin rate (step 38) to ensure that the spin-up parameters can still be met. For example, if the ambient temperature decreases, the control circuitry may increase the second spin rate to ensure a spin-up time limit can be met at the lower ambient temperature. Conversely if the ambient temperature increases, the control circuitry may decrease the second spin rate to save additional power while still meeting the spin-up parameters. In one embodiment, there may be a single spin-up time limit and power setting such that the reduced spin rate varies based only on the ambient temperature.

Figure 6A:
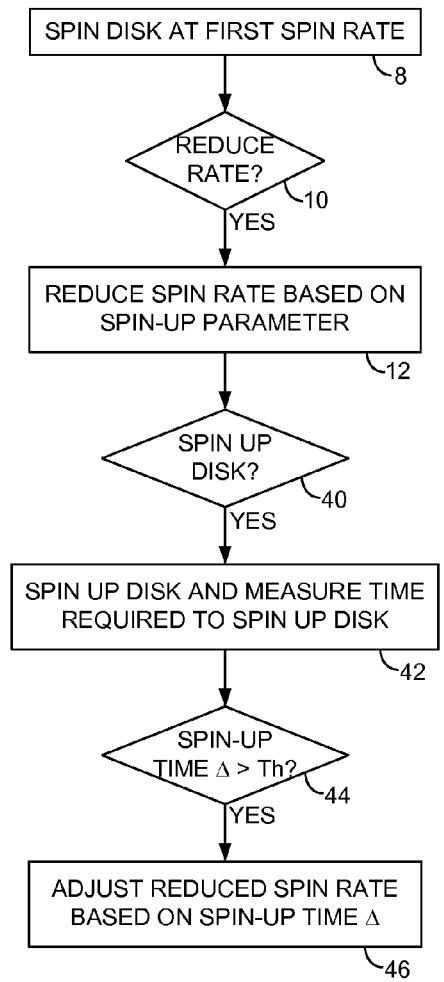
FIG. 6A is a flow diagram according to an embodiment of the present invention wherein the reduced spin rate is adapted over time based on a measured spin-up time.

FIG. 6A is a flow diagram according to an embodiment of the present invention which extends on the flow diagram of FIG. 1B, wherein while the disk drive is in the reduced spin rate operating mode, a decision is made to spin up the disk from the second spin rate to the first spin rate (step 40). The control circuitry spins up the disk to the first spin rate and measures the actual time needed to spin up the disk (step 42). The control circuitry computes a spin up delta (Δ) as a difference between the actual spin up time and the spin-up time limit. If the spin-up time delta exceeds a threshold (step 44), the control circuitry adjusts the second spin rate in response to the spin-up delta (step 46). Accordingly, in this embodiment the control circuitry adapts the second, reduced spin rate over time until the actual spin-up time substantially matches the spin-up time limit, thereby optimizing operation of the disk drive (e.g., optimizing power consumption).

Figure 6B:
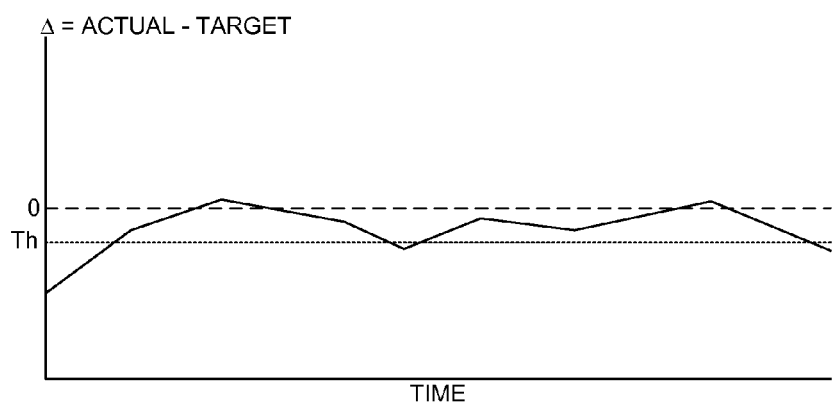
FIG. 6B shows an embodiment of the present invention wherein the reduced spin rate is adapted over time so that the actual spin-up time substantially matches the spin-up time limit.

FIG. 6B shows an embodiment of the present invention wherein the second, reduced spin rate is initialized with a significant margin that guarantees the spin-up parameters (e.g., spin-up time limit) will be met. The second, reduced spin rate is then adapted over time (e.g., decreased) until the actual spin-up time substantially matches the spin-up time limit (within a predetermined threshold). If the spin-up delta exceeds zero (positive), the control circuitry may adjust the second, reduced spin rate (e.g., increase the spin rate) to help ensure the actual spin-up time remains less than the spin-up time limit. Over time the control circuitry may adjust the second, reduced spin rate (e.g., decrease the spin rate) when the actual spin-up time falls below the threshold as shown in FIG. 6B.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;

a head actuated over the disk; and control circuitry operable to:

spin the disk at a first spin rate; and reduce the spin rate of the disk from the first spin rate to a second spin rate selected from a plurality of second spin rates, wherein the second spin rate is selected based on a spin-up parameter associated with spinning up the disk from the second spin rate to the first spin rate, wherein the spin-up parameter comprises a peak current available.

2. The disk drive as recited in claim 1, wherein the control circuitry is further operable to receive a command from a host to enter an operating mode associated with the second spin rate.

3. The disk drive as recited in claim 2, wherein the control circuitry is further operable to:

receive a command from the host to enter one of a plurality of operating modes; and reduce the spin rate of the disk to one of a plurality of spin rates corresponding to the operating mode, wherein the reduced spin rate is based on the spin-up parameter.

4. The disk drive as recited in claim 3, wherein the control circuitry is further operable to look up the reduced spin rate in response to the operating mode.

5. The disk drive as recited in claim 1, wherein the control circuitry is further operable to compute the reduced spin rate as a function of the spin-up parameter.

6. A method of operating a disk drive comprising a head actuated over a disk, the method comprising:

spinning the disk at a first spin rate; and reducing the spin rate of the disk from the first spin rate to a second spin rate selected from a plurality of second spin rates, wherein the second spin rate is selected based on a spin-up parameter associated with spinning up the disk from the second spin rate to the first spin rate, wherein the spin-up parameter comprises a peak current available.

7. The method as recited in claim 6, further comprising receiving a command from a host to enter an operating mode associated with the second spin rate.

8. The method as recited in claim 7, further comprising:

receiving a command from the host to enter one of a plurality of operating modes; and reducing the spin rate of the disk to one of a plurality of spin rates corresponding to the operating mode, wherein the reduced spin rate is based on the spin-up parameter.

9. The method as recited in claim 8, further comprising looking up the reduced spin rate in response to the operating mode.

10. The method as recited in claim 6, further comprising computing the reduced spin rate as a function of the spin-up parameter.

11. A disk drive comprising:

a disk;

a head actuated over the disk; and control circuitry operable to:

spin the disk at a first spin rate;

reduce the spin rate of the disk from the first spin rate to a second spin rate based on a spin-up parameter associated with spinning up the disk from the second spin rate to the first spin rate;

measure an actual spin-up time to spin up the disk from the second spin rate to the first spin rate; and adjust the second spin rate in response to the actual spin-up time.

12. The disk drive as recited in claim 11, wherein the control circuitry is further operable to adjust the second spin rate in response to a difference between the actual spin-up time and a spin-up time limit.

13. A method of operating a disk drive comprising a head actuated over a disk, the method comprising:

spinning the disk at a first spin rate;

reducing the spin rate of the disk from the first spin rate to a second spin rate, wherein the second spin rate is based on a spin-up parameter associated with spinning up the disk from the second spin rate to the first spin rate;

measuring an actual spin-up time to spin up the disk from the second spin rate to the first spin rate; and adjusting the second spin rate in response to the actual spin-up time.

14. The method as recited in claim 13, further comprising adjusting the second spin rate in response to a difference between the actual spin-up time and a spin-up time limit.

15. A disk drive comprising:

a disk;

a head actuated over the disk; and control circuitry operable to:

spin the disk at a first spin rate; and reduce the spin rate of the disk from the first spin rate to a second spin rate selected from a plurality of second spin rates, wherein the second spin rate is selected based on a spin-up parameter associated with spinning up the disk from the second spin rate to the first spin rate, wherein the spin-up parameter comprises an ambient temperature and a lower ambient temperature corresponds to a higher second spin rate.

16. The disk drive as recited in claim 15, wherein the control circuitry is further operable to receive a command from a host to enter an operating mode associated with the second spin rate.

17. The disk drive as recited in claim 16, wherein the control circuitry is further operable to:

receive a command from the host to enter one of a plurality of operating modes; and reduce the spin rate of the disk to one of a plurality of spin rates corresponding to the operating mode, wherein the reduced spin rate is based on the spin-up parameter.

18. The disk drive as recited in claim 17, wherein the control circuitry is further operable to look up the reduced spin rate in response to the operating mode.

19. The disk drive as recited in claim 15, wherein the control circuitry is further operable to compute the reduced spin rate as a function of the spin-up parameter.

20. A method of operating a disk drive comprising a head actuated over a disk, the method comprising:

spinning the disk at a first spin rate; and reducing the spin rate of the disk from the first spin rate to a second spin rate selected from a plurality of second spin rates, wherein the second spin rate is selected based on a spin-up parameter associated with spinning up the disk from the second spin rate to the first spin rate, wherein the spin-up parameter comprises an ambient temperature and a lower ambient temperature corresponds to a higher second spin rate.

21. The method as recited in claim 20, further comprising receiving a command from a host to enter an operating mode associated with the second spin rate.

22. The method as recited in claim 21, further comprising:

receiving a command from the host to enter one of a plurality of operating modes; and reducing the spin rate of the disk to one of a plurality of spin rates corresponding to the operating mode, wherein the reduced spin rate is based on the spin-up parameter.

23. The method as recited in claim 22, further comprising looking up the reduced spin rate in response to the operating mode.

24. The method as recited in claim 20, further comprising computing the reduced spin rate as a function of the spin-up parameter.

* * * * *